No. 866,208. PATENTED SEPT. 17, 1907.
J. F. MEIGS, H. G. JAKOBSSON & S. BRAND.
SIGHTING DEVICE.
APPLICATION FILED FEB. 13, 1906.
2 SHEETS—SHEET 1.
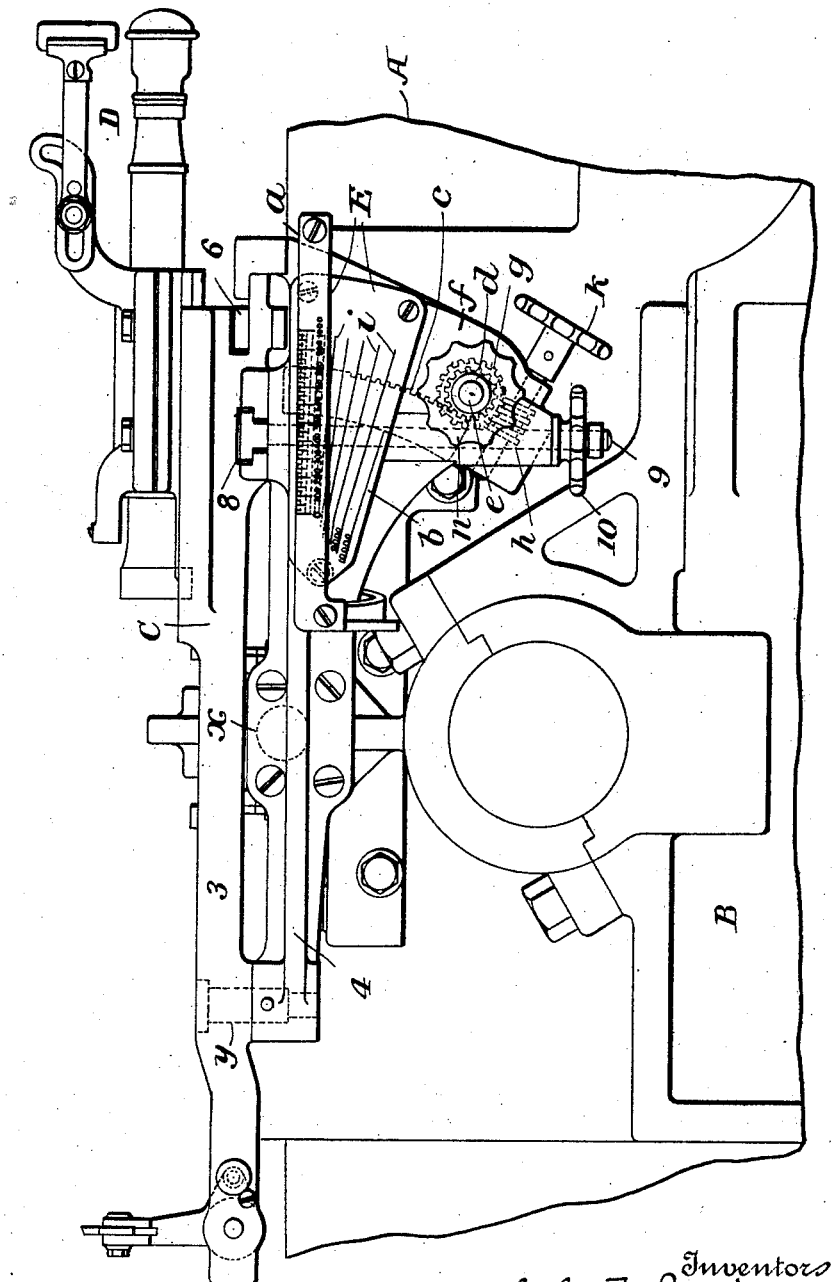

No. 866,208. PATENTED SEPT. 17, 1907.
J. F. MEIGS, H. G. JAKOBSSON & S. BRAND.
SIGHTING DEVICE.
APPLICATION FILED FEB. 13, 1906.
2 SHEETS—SHEET 2.
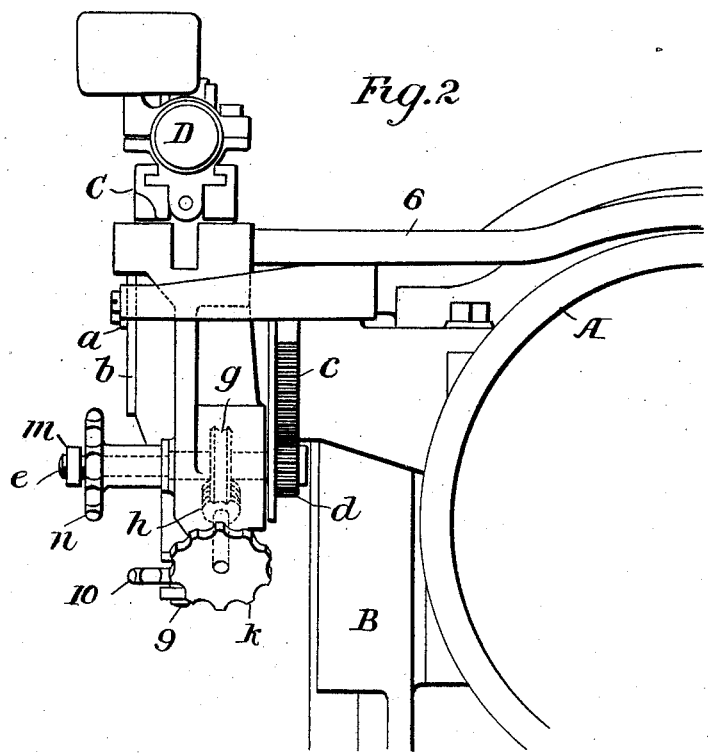
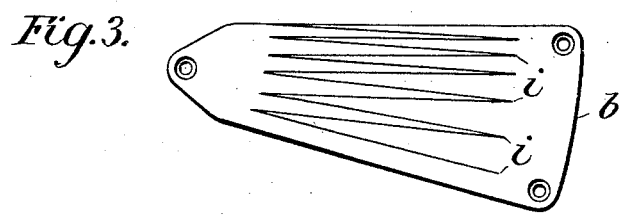
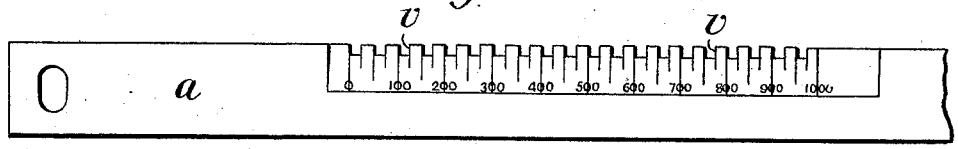

UNITED STATES PATENT OFFICE.

JOHN F. MEIGS, HERMAN G. JAKOBSSON, AND SAMUEL BRAND, OF SOUTH BETHLEHEM, PENNSYLVANIA, ASSIGNORS TO BETHLEHEM STEEL COMPANY, OF SOUTH BETHLEHEM, PENNSYLVANIA, A CORPORATION OF PENNSYLVANIA.

SIGHTING DEVICE.

No. 866,208.  Specification of Letters Patent.  Patented Sept. 17, 1907.

Application filed February 13, 1906. Serial No. 300,898.

*To all whom it may concern:*

Be it known that we, JOHN F. MEIGS, a citizen of the United States, HERMAN G. JAKOBSSON, a subject of the King of Sweden, and SAMUEL BRAND, a citizen of the United States, respectively, residing at South Bethlehem, in the county of Northampton and State of Pennsylvania, have invented certain new and useful Improvements in Sighting Devices, of which the following is a specification.

Our invention relates to scales for indicating and determining the adjustments of guns for different ranges and adapted for use in connection with the sighting devices, and consists of a scale with diverging lines and a graduated vernier adapted respectively for attachment to the gun and to a part adjustable thereon and combined with the same, as fully set forth hereinafter and as illustrated in the accompanying drawing, in which Figure 1 is a side elevation of part of a gun and its support showing an attachment embodying our invention; Fig. 2 is a rear view of Fig. 1, showing the parts at one side of the gun; Fig. 3, a view showing a scale plate with the diverging lines differently arranged; Fig. 4, an enlarged view of the vernier plate showing a different construction.

The improvement may be used with any character of gun A supported upon a carriage B to be adjusted to different angles vertically or horizontally in azimuth or both, and provided with suitable sighting devices D. As shown, the sighting devices are supported upon a bracket C pivoted to the gun, or its cradle or sleeve, at $x$, either at one side or on both sides of the gun; and with the gun and bracket are connected the two parts of a scale E, comprising the vernier $a$ and the scale plate $b$. Preferably as shown, the scale plate is secured to the bracket and the vernier is secured, opposite the scale plate, to the gun or its sleeve to move therewith. The relation of these two parts in respect to each other indicates the proper inclinations of the gun in sighting for different distances, and one of these parts (that connected to move with the bracket) always bears a fixed relation to the sighting devices, that is, it has no adjustment in respect thereto, so there can not possibly be any such inaccuracies in sighting which result from lost motion of the connecting and adjusting devices, as when the scale is movable so as to be set to different positions in respect to the sighting devices.

Different means may be employed for imparting the proper adjustment to the bracket to level the sighting devices. It may even be done by hand, but as shown, the cradle supports a segmental rack $c$ with which engages a pinion $d$ on a shaft $e$ which turns in an arm $f$ of the bracket and carries a worm wheel $g$. This shaft $e$ may be turned from a hand wheel $k$ by means of a worm $h$ on the shaft of said wheel engaging the worm wheel $g$.

The ordinary scales used in connection with gun sights are graduated with divisions at the curved edge of the scale plate adjacent to which the adjustable pointer or index finger moves, so that all the readings must be contained within the length of this edge which is necessarily limited, so that the graduations are so close together that it is difficult to indicate adjustments which show the range to the extent of hundreds of feet. To avoid this defect, or the use of extremely large scale plates, we provide the latter with a series of diverging lines $i$, $i$, the forward end of the upper line being opposite the upper reading edge of the vernier when the sighting devices and gun are horizontal, and the line being so inclined that a change of angle of the gun which will bring the rear end of the upper line to intersect the edge of the vernier, will indicate any predetermined amount or distance, say 1000 yards. The vernier is graduated to indicate equal divisions of this amount so that the position of the intersecting point of said line $i$ in respect to the edge of the vernier will indicate the amount to be added to that indicated by the intersected line $i$. Thus, if the difference in adjustment to bring the edge of the vernier from one end to the other of the line $i$ indicates 1000 yards, then the vernier edge may be subdivided into ten divisions and the change of angle of the gun bringing the intersecting point of a line $i$ opposite any division will show the distance indicated by such division plus the distance indicated by any line above.

As shown, each line $i$ is inclined downward toward the rear, making the reading in this case from left to right, so that the difference in angle resulting from the intersecting of the beginning and end of the line with the vernier edge indicates a distance of 1000 yards and the starting point of each line is on the same plane in respect to the vernier edge as the terminal point of the line next above. By this means we extend the scale to a length equal to the combined lengths of the lines $i$, say sixty inches, (when there are ten lines each six inches in length,) more than ten times the length of any scale that could be indicated on the arc or curved edge of a scale plate of the same size. The scale plate might be on the gun and the vernier on a part attached to the bracket, but in either case, each part of the device is fixed positively to its support and is not adjustable in respect thereto in setting the sight for different ranges, so that there can be no inaccuracy from displacement or lost motion.

It will be evident that the lines $i$ instead of diverging from the front and reading from left to right, may diverge from the rear and read from right to left, or they may diverge from the opposite end, reading from left to right, or in opposite directions, as shown in Fig. 3, the vernier plate being numbered from both ends, or the scale may be at the rear instead of at the side. We do not limit ourselves to the particular elevating means shown, as any suitable appliances may be used to raise and lower the bracket.

To swing the sights horizontally, the bracket C is divided so that an upper frame or portion 3 carrying the sighting devices may swing about a pivot $y$, connecting it with the lower frame or portion 4; and when there are sighting devices at opposite sides of the gun, the two frames 3 are connected by a cross bar or rod 6, as set forth in application for Letters Patent, Serial No. 211,175. To permit this swinging movement of the upper section of the bracket without interfering with its movement about the pivot $x$, and to secure the two sections together after adjustment, the upper frame 3 has a dove-tailed slot 8 at its under side to receive the T-head of a bolt 9 which extends through an opening in the arm $f$ of the bracket and has a threaded lower end receiving a hand nut 10, which may be turned to draw down the bolt and bind the two frames of the bracket together, or to loosen the bolt and permit the upper frame to swing about its pivot $y$.

It will be evident that the scale consisting of the scale plate with diverging lines and graduated vernier strip may be placed horizontally to indicate changes of angle in azimuth, and in connection with sighting devices or other means for determining the elevation or horizontal range of the gun. While the edge of the vernier plate may be straight, it is preferable to notch it to form short edges $v$, Fig. 4 at right angles to the line of the plate, as these short edges will enable the exact point of intersection of the vernier plate and line $i$ to be better determined.

When the bracket is adjusted by moving it by hand, the worm and wheels $h$, $g$, may be dispensed with, in which case, to secure the parts after adjustment, the shaft $e$ of the pinion $d$ may be threaded at the end to receive a binding thumb nut $n$, a collar $m$ preventing a too extended movement of the nut.

Without limiting ourselves to the construction shown, we claim:

1. The combination with a gun and its carriage, of sighting devices, a scale plate having diverging lines, each indicating by its angle a determined amount, and a vernier plate graduated to show divisions of said amount, and overlying the said plate, one of the said parts connected to move with the gun and the other having a fixed relation to the sighting devices and adjustable in respect to that on the gun, substantially as set forth.

2. The combination with a gun and sighting devices adjustable in respect thereto, of a scale plate having diverging lines each indicating a predetermined amount, and a vernier graduated to equal divisions of said amount, one of said parts connected to move with the gun and the other having a fixed relation to and moving with the sighting devices, substantially as set forth.

3. The combination with a gun, of a bracket pivoted to swing in respect to the gun and sighting devices connected to move therewith, a scale plate with diverging lines, and a vernier plate extending over the scale plate, one of said parts connected with the bracket and the other with the gun, substantially as set forth.

4. The combination with a gun, of a bracket pivoted to swing in respect to the gun sighting devices connected to move with the bracket, a scale plate with lines diverging from the pivotal point of the bracket, and a vernier plate extending over the scale plate, one of said parts connected with the bracket and the other with the gun, substantially as set forth.

5. The combination with a gun, of a bracket pivoted to swing in respect to the gun, sighting devices connected to move with the bracket, a scale plate with lines diverging from the pivotal point of the bracket, and a vernier plate extending over the scale plate and graduated to divisions of the amount indicated by any one line, and with short edges $v$ at right angles to the line of said plate.

6. The combination with a gun, of a bracket pivoted to swing in respect to the gun, sighting devices carried by said bracket, a scale plate with diverging lines the highest point on one line on the same reading plane as the lowest point of the next line, and a vernier plate extending over the scale plate, one of said parts connected with the bracket and the other with the gun, substantially as set forth.

7. The combination with the two-part bracket of a connecting pivot, one part adapted to support sighting devices and the other for connection with a gun, of a T-headed bolt extending through one part and carrying a nut and a dove-tailed slot in the other part adapted to receive the head of said bolt, substantially as set forth.

In testimony whereof we affix our signatures in presence of witnesses.

JOHN F. MEIGS.
HERMAN G. JAKOBSSON.
SAMUEL BRAND.

Witnesses:
LEIGHTON P. D. MIXSELL,
EDWIN A. MILLER,
PATRICK G. NOLAN.